United States Patent [19]
Hashimoto et al.

[11] Patent Number: 4,973,373
[45] Date of Patent: Nov. 27, 1990

[54] PROCESS FOR PRODUCING LIQUID CRYSTAL OPTICAL DEVICE

[75] Inventors: Kenji Hashimoto; Kimihiro Yuasa, both of Chiba, Japan

[73] Assignee: Idemitsu Kosan Co., Ltd., Tokyo, Japan

[21] Appl. No.: 331,803

[22] Filed: Apr. 3, 1989

[30] Foreign Application Priority Data

Apr. 4, 1988 [JP] Japan ................................ 63-81387

[51] Int. Cl.$^5$ ............................................. B32B 31/12
[52] U.S. Cl. ................................. 156/229; 156/324; 350/339 R; 428/1
[58] Field of Search ............... 156/153, 154, 229, 324; 350/334, 339 R; 428/1

[56] References Cited

U.S. PATENT DOCUMENTS

| | | | |
|---|---|---|---|
| 4,783,149 | 11/1988 | Umeda et al. | 350/339 R X |
| 4,826,297 | 5/1989 | Kubo et al. | 350/339 R |
| 4,828,363 | 5/1989 | Yamazaki | 350/339 R |

*Primary Examiner*—Robert A. Dawson
*Attorney, Agent, or Firm*—Antonelli, Terry, Stout & Kraus

[57] ABSTRACT

A process for producing a liquid crystal optical device comprising a ferroelectric liquid-crystalline polymer and two flexible substrates sandwiching the ferroelectric liquid-crystalline polymer between them, which process comprises the following continuously conducted stages of:

the first stage including a step of forming an oriented layer on each of the two flexible substrates; the second stage including a step of forming a liquid-crystalline polymer layer on the oriented layer of at least one of the two flexible substrates; the third stage including a step of laminating the flexible substrate obtained in the first stage and the flexible substrate obtained in the second stage, or laminating two flexible substrates obtained in the second stage, with the one or two liquid-crystalline polymer layers sandwiched facing each other between the oriented layers carried on the flexible substrates; and the fourth stage including a step of heating the laminate obtained in the third stage to a temperature at which the ferroelectric liquid-crystalline polymer shows isotropic phase, and a step of orienting the ferroelectric liquid-crystalline polymer by applying an orientation treatment to the laminate heated in the heating step.

18 Claims, 4 Drawing Sheets

PROCESS FOR PRODUCING LIQUID CRYSTAL OPTICAL DEVICE

BACKGROUND OF THE INVENTION (a) Field of the Invention

The present invention relates to a process for producing liquid crystal optical devices, particularly, to an efficient and economical process for continuously producing liquid crystal optical devices of high quality, which liquid crystal optical devices may be suitably used for display devices and memory devices using liquid crystals, especially for liquid crystal display devices which may be suitably used for display of moving pictures due to their excellent response property to external factors, and may as well be suitably used as of various shapes, such as those having a large picture plane or curved picture plane.

(b) Description of the Related Art

There have been made attempts to produce liquid crystal optical devices by using flexible substrates in order to obtain liquid crystal optical devices having such a good forming processability that they may be easily formed into large picture planes, curved picture planes, or the like. For example, Japanese Patent Application Laid-open No. 62-267720 discloses a method of using a plastic substrate as one side of the substrates and spreading a low molecular weight liquid crystal from a slit nozzle on the plastic substrate followed by adhering them by pressure using a pressure roller. Japanese Patent Application Laid-open No. 62-227122 discloses another method of applying a mesogenic side chain liquid-crystalline polymer to a substrate followed by carrying out shear orientation.

The method described in Japanese Patent Application Laid-open No. 62-267720, however, has disadvantages in that the use of the slit nozzle makes it difficult to uniformalize the outflow of the liquid crystal with the result that the excessive liquid crystal is pushed aside toward the adhesive layer at the time of pressing, and that because the method is carried out in a vacuum chamber, the complicated pressure adjusting is inevitable each time the substrate is carried in or out. The method described in Japanese Patent Application Laid-open No. 62-227122 also has serious problems. That is, the productivity is poor because each of the operations of coating of the liquid crystal, application of shear, etc. is conducted in batch system; owing to insufficient consideration of the stage for laminating the other substrate, incorporation of bubbles and disturbance of orientation tend to occur in the stage; and liquid crystal display devices having high speed response property cannot be obtained because ferroelectric liquid-crystalline polymer is not employed.

Therefore, in the industry manufacturing liquid crystal optical devices, there still remains a great problem that an easy and efficient process should be developed for producing liquid crystal optical devices having good forming processability and excellent fundamental properties, such as high speed response property.

SUMMARY OF THE INVENTION

An object of the present invention is to solve the above-described problems and to provide a practically extremely advantageous process for producing liquid crystal optical devices of high quality which have so excellent forming processability that they can be easily formed into liquid crystal optical devices having a variety of forms such as large picture planes or curved picture planes and have excellent fundamental properties such as high speed response property, high contrast ratio, and bistable switching and memory effect, which process is a continuous production process being able to produce such liquid crystal optical devices easily with high efficiency, high productivity, and low cost.

The inventors repeated studies and found it is very effective for attaining the object of the present invention to use, as a substrate, a flexible substrate of rolled form, etc., which excels in forming processability and is advantageous for continuous production process; to use, as a liquid crystal material, a ferroelectric liquid-crystalline polymer which is effective for obtaining desirable fundamental properties such as high speed response property and high contrast ratio; to use a specified technique for improving the oriented state of the liquid crystal units, that is to heat once the laminate composed of the substrates and the ferroelectric liquid-crystalline polymer sandwiched therein to a temperature at which the liquid-crystalline polymer shows isotropic phase, and then apply an orientation treatment to the laminate to orient liquid crystal units; and to employ a continuous production system for the production process. The knowledge led the inventors to accomplish the present invention of a process for continuously producing a liquid crystal optical device having no polarizing plate. Further, the inventors found that by adding a stage of attaching a polarizing plate, the above continuous process can be easily developed to a continuous process of producing a liquid crystal optical devices with a polarizing plate, and consequently accomplished an invention of the continuous process for producing a liquid crystal optical devices with a polarizing plate.

That is, the present invention provides a process for producing a liquid crystal optical device comprising a ferroelectric liquid-crystalline polymer and two flexible substrates sandwiching the ferroelectric liquid-crystalline polymer between them, which process comprises the following continuously conducted stages of:

(1) the first stage including a step of forming an oriented layer, wherein in the step of forming an oriented layer, an oriented layer is formed on each of the two flexible substrates to obtain two flexible substrates each carrying the oriented layer, (2) the second stage including a step of forming a liquid-crystalline polymer layer, wherein in the step of forming a liquid-crystalline polymer layer, a ferroelectric liquid-crystalline polymer layer is formed on the oriented layer of at least one of the two flexible substrates each carrying the oriented layer which have been obtained in the first stage, to obtain at least one flexible substrate carrying the oriented layer and the liquid-crystalline polymer layer, (3) the third stage including a laminating step, wherein in the laminating step, one flexible substrate carrying an oriented layer, which has been obtained in the first stage, and one flexible substrate carrying an oriented layer and a liquid-crystalline polymer layer, which has been obtained in the second stage, are laminated, with the liquid-crystalline polymer layer sandwiched between the oriented layers carried on the flexible substrates, or two flexible substrates each carrying an oriented layer and a liquid-crystalline polymer layer, which have been obtained in the second stage, are laminated, with the two liquid-crystalline polymer layers sandwiched facing each other between the oriented layers carried on the flexible substrates, to obtain a laminate, (4) the fourth stage including a heating step and an orientation step, wherein in the heating step, the laminate obtained in the third stage is heated to a temperature at which the ferroelectric liquid-crystalline polymer shows isotropic phase, and in the orientation step, the ferroelectric liquid-crystalline polymer is oriented by applying an orientation treatment to the laminate heated in the heating step.

Further, the present invention also provides a process for producing a liquid crystal optical device comprising a ferroelectric liquid-crystalline polymer and two flexible substrates sandwiching the ferroelectric liquid-crystalline polymer between them, which process comprises the following continuously conducted stages of:

(1) the first stage including a step of forming an oriented layer, wherein in the step of forming an oriented layer, an oriented layer is formed on each of the two flexible substrates to obtain two flexible substrates each carrying an oriented layer, (2) the second stage including a step of forming a liquid-crystalline polymer layer, wherein in the step of forming a liquid-crystalline polymer layer, a ferroelectric liquid-crystalline polymer layer is formed on the oriented layer of at least one of the two flexible substrates each carrying the oriented layer which have been obtained in the first stage, to obtain at least one flexible substrate carrying an oriented layer and a liquid-crystalline polymer layer, (3) the third stage including a laminating step, wherein in the laminating step, one flexible substrate carrying an oriented layer, which has been obtained in the first stage, and one flexible substrate carrying an oriented layer and a liquid-crystalline polymer layer, which has been obtained in the second stage, are laminated, with the liquid-crystalline polymer layer sandwiched between the oriented layers carried on the flexible substrates; or two flexible substrates each carrying an oriented layer and a liquid-crystalline polymer layer, which have been obtained in the second stage, are laminated, with the two liquid-crystalline polymer layers sandwiched facing each other between the oriented layers carried on the flexible substrates, to obtain a laminate, (4) the fourth stage including a heating step and an orientation step wherein in the heating step, the laminate obtained in the third stage is heated to a temperature at which the ferroelectric liquid-crystalline polymer forms isotropic phase, and in the orientation step, the ferroelectric liquid-crystalline polymer is oriented by applying an orientation treatment to the laminate heated in the heating step, and (5) the fifth stage including a step of attaching a polarizing plate, wherein in the step of attaching a polarizing plate, a polarizing plate is adhered on the orientation-treated laminate obtained in the fourth stage.

BRIEF DESCRIPTION OF THE DRAWINGS

The present invention with additional objects and advantages thereof will be best understood from the following description when read in connection with the accompanying drawings in which:

FIG. 6(a) being a front elevation view of the lamination operation and FIG. 6(b) being a top view from the upper surface of the lamination operation.

DESCRIPTION OF THE PREFERRED EMBODIMENTS

Figure 1:
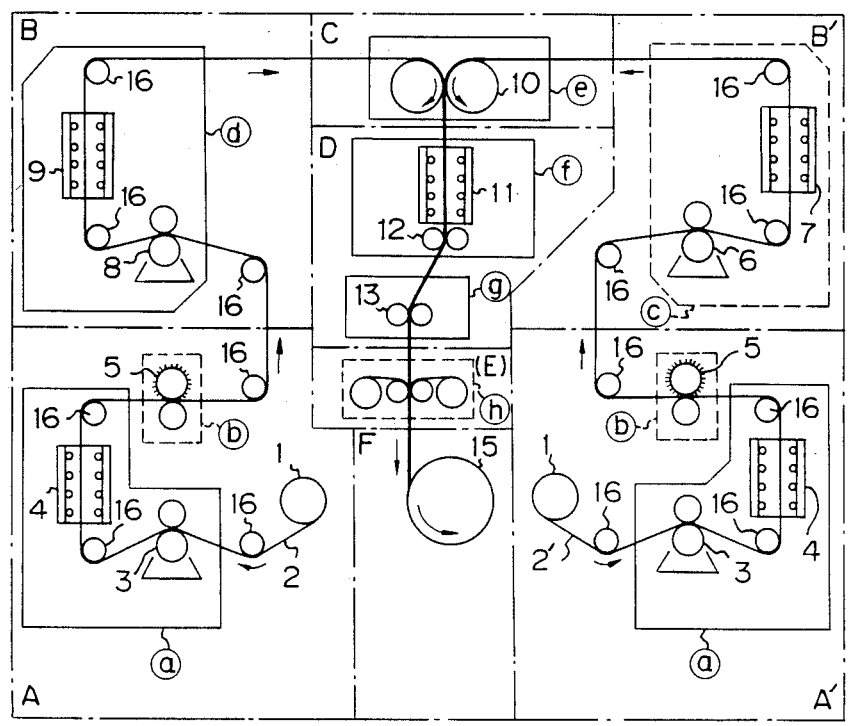
FIG. 1 diagrammatically shows an embodiment of the continuous process for producing a liquid crystal optical device according to the present invention.

The heating step of the fourth stage may be carried out by a method of passing the laminate through between a couple of heating rollers or through a thermostatically heating chamber or both through between a couple of heating rollers and through a thermostatically heating chamber. This method is advantageous because of the high efficiency and easiness of the operation which can be incorporated as a part of the continuous process, and is very effective as a pretreatment before the orientation step.

The orientation step of the fourth stage may be carried out by a method of passing the laminate through between at least a couple of rollers. This method is advantageous because of the high efficiency and the easiness of the orientation operation as a part of the continuous process, and can extremely improve the oriented state.

The processes of the present invention may further comprise a step of forming an adhesive layer on the oriented layer of at least one of the flexible substrates each carrying an oriented layer by coating an adhesive on the surface of the oriented layer or by other means. Thus formed adhesive layer improves effectively the stability of the laminate during processing and the stability of the produced liquid crystal optical device during processing and usage.

The processes of the present invention may further comprise a rubbing step of applying a rubbing treatment to at least one of the flexible substrates each carrying an oriented layer. The addition of the rubbing step improves the oriented state resulting in the improvement of the visual qualities of the produced liquid crystal optical device. Further, undesirable coloration caused by birefringence, which may occur in some kinds of substrates, can be prevented effectively by varying the direction of the rubbing treatment.

Both the rubbing step and the step of forming an adhesive layer may be incorporated in combination in the process of the present invention by forming an adhesive layer on the oriented layer of at least one of the rubbing-treated flexible substrates each carrying an oriented layer. Both of the effects of the rubbing step and the step of forming an adhesive layer can be attained by the combination of the two steps.

The flexible substrate to be used in the present invention may be a variety of substrates such as those known in the art, that is, flexible substrates which have been previously provided an electrode layer on one surface of each of usual flexible substrates, provided that at least one of the two flexible substrates to be used is a transparent substrate carrying on its surface a transparent electrode layer, and the other flexible substrate may be likewise transparent substrate or a substrate wherein either the substrate or the electrode layer is transparent or neither of them is transparent.

Some illustrative examples of the resins for the flexible substrates to be used in the present invention include polyesters such as polyethyleneterephthalate (PET) and polybutyleneterephthalate, polycarbonates. polypropylene, polyether sulfones (PES), and polyamides. Among these, the preferred are polyethyleneterephthalate and polyether sulfones.

The electrode layer to be used may be a conventional one, and some illustrative examples of the electrode layer include tin oxide film called NESA film, indium oxide layer wherein tin oxide is mixed, the layer being called ITO film, and thin films of metals such as gold and titanium, which are thin films having conductivity. Among these the particularly preferred for the transparent electrode layer are ITO film, etc.

The two flexible substrates preferably have a form suitable for conducting the continuous production process, such as a form of film or sheet, and it is desirable to use such substrates in rolled state.

The ferroelectric liquid-crystalline polymer to be used in the present invention may be a variety of polymers having properties of ferroelectric liquid crystals, for example, (a) ferroelectric liquid-crystalline polymers which have, in their side chains, the groups capable of exhibiting ferroelectric liquid crystal properties, (b) ferroelectric liquid-crystalline polymers wherein adducts are formed by the bonding of polymer molecules and low molecular weight liquid-crystalline compounds through hydrogen bonds or the like, (c) ferroelectric liquid-crystalline polymers wherein a polymer and a ferroelectric liquid-crystalline low molecular weight compound are mixed together, and (d) mixtures thereof. Among these a variety of liquid-crystalline polymers, the particularly preferred ar those having chiral smectic C phase (SmC* phase).

Some illustrative examples of the ferroelectric liquid-crystalline polymers of the above (a) type include polymers, copolymers, and blends thereof each having one or more of the repeating units represented by the following general formulas.

(1) Polyacrylate type (The following polymers are disclosed in Japanese Patent Application Laid-open No. 63-99204 and Japanese Patent Application Laid-open No. 63-273608.)

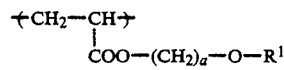

wherein a is an integer of from 1 to 30.

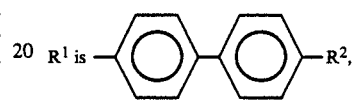

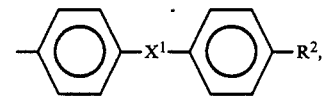

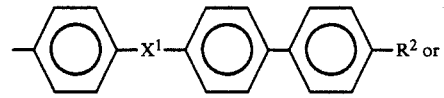

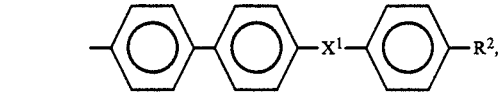

$X^1$ being —COO— or —OCO—, $R^2$ being —COOR$^3$, —OCOR$^3$, —OR$^3$ or —R$^3$, $R^3$ being a group represented by the following formula

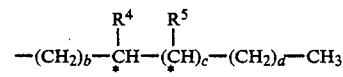

wherein each b and d independently is an integer of from 0 to 9, c is 0 or 1, each $R^4$ and $R^5$ independently is —CH$_3$, —Cl or —CN, and C* is an asymmetric carbon atom.

The number average molecular weight of the polymer is preferably from 1,000 to 400,000. If the number average molecular weight is less than 1,000, the forming quality of the polymers in the process of forming into film or coated film may be insufficient. On the other hand, a number average molecular weight larger than 400,000 may produce undesirable results such as a prolonged response speed. Although the particularly preferred range of the number average molecular weight varies depending on the kind of $R^1$, the numerical value of a, the optical purity of $R^3$, etc., it is generally from 1,000 to 200,000.

The polymers, generally, may be prepared by polymerizing a monomer represented by the following formula

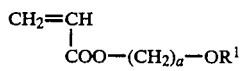

wherein a and $R^1$ are as defined above, employing a known polymerization method.

The temperature ranges at which SmC* phase is exhibited ($T_{sc}{}^*$) and the average molecular weight (Mn) of two of the polymers of polyacrylate type having the following repeating units are as follows.

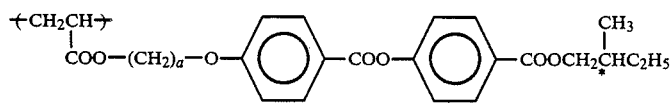

(a) a=12, Mn=5300, $T_{sc}{}^*$: 5°–12° C.
(b) a=14, Mn=6500, $T_{sc}{}^*$: 13°–31° C.

(II) Polyether type (The following polymers are disclosed in Japanese Patent Application Laid-open No. 63-264629.)

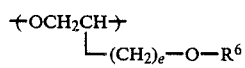

wherein e is an integer of from 1 to 30.

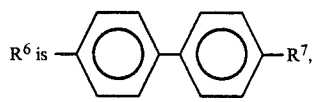

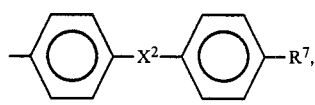

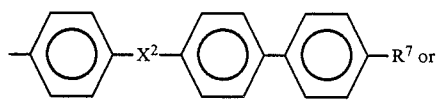

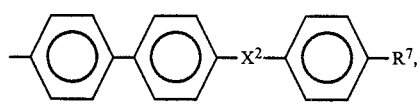

$X^2$ being —COO— or —OCO—, $R^7$ being —COOR$^8$, —OCOR$^8$ or —OR$^8$, $R^8$ being a group represented by the following formula

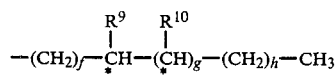

wherein each f and h independently is an integer of from 0 to 9, g is 0 or 1, each $R^9$ and $R^{10}$ independently is —CH$_3$, —Cl or —CN, and C* is an asymmetric carbon atom.

The number average molecular weight of the polymer is preferably from 1,000 to 400,000. If the number average molecular weight is less than 1,000, the forming quality of the polymers in the process of forming into film or coated film may be insufficient. On the other hand, a number average molecular weight larger than 400,000 may produce undesirable results such as a prolonged response speed. Although the particularly preferred range of the number average molecular weight varies depending on the kind of $R^6$, the numerical value of e, the optical purity of $R^8$, etc., it is generally from 1,000 to 200,000.

The polymers, generally, may be prepared by polymerizing a monomer represented by the following formula

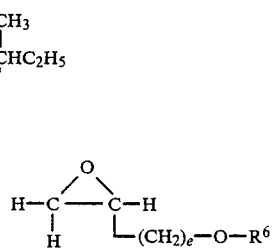

wherein e and $R_6$ are as defined above, employing a known polymerization method.

The temperature ranges at which SmC* phase is exhibited (Tsc*) and the average molecular weights (Mn) of two of the polymers of polyether type having the following repeating units are as follows.

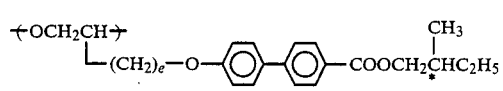

(a) e=8, Mn=2800, Tsc*: 24°–50° C.
(b) e=10, Mn=2400, Tsc*: 19°–50° C.

(III) Polysiloxane type (The following polymers are disclosed in Japanese Patent Application Laid-open No. 63-280742.)

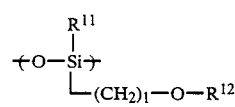

wherein $R^{11}$ is an lower alkyl radical i is an integer of from 1 to 30,

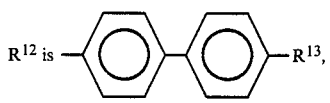

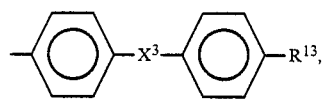

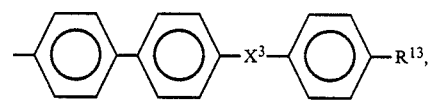

$X^3$ is —COO— or —OCO—, $R^{13}$ is —COOR$^{14}$, —OR$^{14}$ or —OCOR$^{14}$, and $R^{14}$ is a group represented by the following general formula

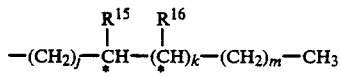

each j and m independently being an integer of from 0 to 9, k being 0 or 1, each $R^{15}$ and $R^{16}$ is —CH$_3$, —Cl or —CN, and C* is an asymmetric carbon atom.

The number average molecular weight of the polymer is preferably from 1,000 to 400,000. If the number average molecular weight is less than 1,000, the forming quality of the polymer in the process of forming into film or coated film may be insufficient. On the other hand, a number average molecular weight larger than 400,000 may produce undesirable results such as a prolonged response speed. Although the particularly preferred range of the number average molecular weight varies depending on the kind of the group $R^{11}$, the numerical values of i, j, and m, he optical purity of the group $R^{14}$, etc., it is generally from 1,000 to 200,000.

The polymers, for example, may generally be prepared by reacting an alkylhydropolysiloxane having the repeating units represented by the following general formula

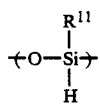

wherein $R^{11}$ is as defined above, with a liquid-crystalline unit compound represented by the following general formula

wherein i and $R^{12}$ are as defined above, under a particular condition.

The temperature ranges at which SmC* phase is exhibited (Tsc*) and the average molecular weights (Mn) of two of the polymers of polyether type having the following repeating units are as follows.

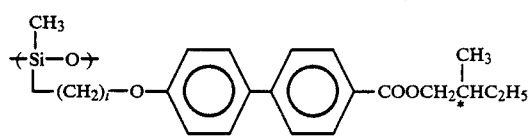

(a) i=6, Mn=16400, Tsc*: 70°–90° C.
(b) i=8, Mn=15000, Tsc*: 39°–91° C.

(IV) Polyester type (Japanese Patent Application No. 62-219225)

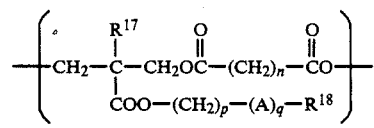

wherein $R^{17}$ is —H, —CH$_3$ or —C$_2$H$_5$, n is an integer of from 1 to 20, p is an integer of from 1 to 30, A is O (oxygen) or —COO—, q is 0 or 1, $R^{18}$ is

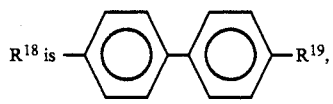

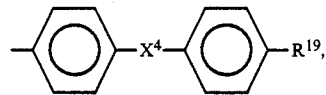

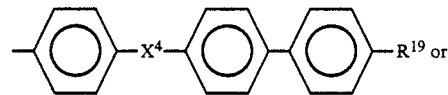

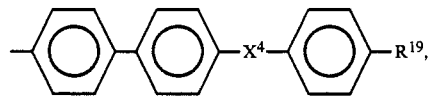

$X^4$ is —COO— or —OCO—, $R^{19}$ is —COOR$^{20}$, —OCOR$^{20}$, —OR$^{20}$, —COR$^{20}$ or —R$^{20}$, $R^{20}$ is a group represented by the following general formula

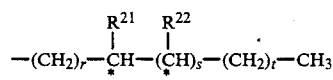

each r and t independently being an integer of from 0 to 9, s being 0 or 1, each $R^{21}$ and $R^{22}$ is —CH$_3$, —Cl or —CN, and C* is an asymmetric carbon atom.

or

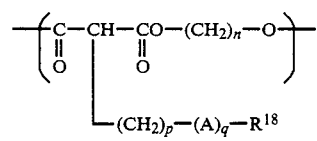

wherein n is an integer of from 1 to 20, p is an integer of from 1 to 30, A is O (oxygen) or —COO—, q is 0 or 1, $R^{18}$ is

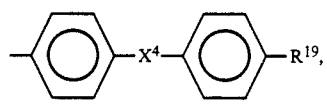

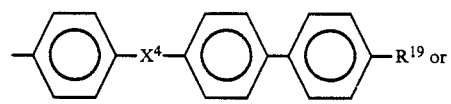

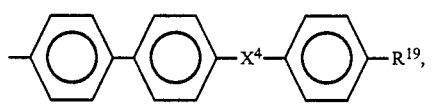

X⁴ is —COO— or —OCO—, R¹⁹ is —COOR²⁰, —OCOR²⁰, —OR²⁰, —COR²⁰ or —R²⁰,

R²⁰ is a group represented by the following general formula

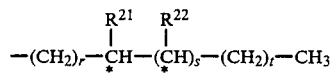

each r and t independently being an integer of from 0 to 9, s being 0 or 1, each R²¹ and R²² is —CH₃, —Cl or —CN, and C* is an asymmetric carbon atom, These polymers may be prepared by a general polycondensation method employed for preparing polyesters. That is, these polymers may be prepared by polycondensing a corresponding dibasic acid or an acid chloride thereof with a corresponding dihydric alcohol.

The number average molecular weight of the polymer is preferably from 1,000 to 400,000. If the number average molecular weight is less than 1,000, the forming quality of the polymer in the process of forming into film or coated film may be insufficient. On the other hand, a number average molecular weight larger than 400,000 may produce undesirable results such as a prolonged response speed. Although the particularly preferred range of the number average molecular weight varies depending on the kind of the group R¹⁸, the numerical value of p, the optical purity of the group R²⁰, etc., it is generally from 1,000 to 200,000.

(V) Copolymers comprising one or more of the repeating units of the above-described (I) polyacrylate type polymers, (II) polyether type polymers, (III) polysiloxane type polymers, and (IV) polyester type polymers.

Some examples of the copolymers comprising one or more of the repeating units of (I), (II), (III), and (IV) include the following copolymers.

(1) Copolymers consisting of the repeating units of the polymer (I) and the repeating units represented by the following general formula

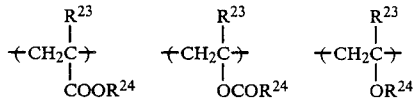

wherein R²³ is —H, —CH³ or —Cl, and R²⁴ is an alkyl or aryl group of C₁₋₁₀.

The preferred number average molecular weight of the copolymer is from 1,000 to 200,000, more preferably from 2,000 to 100,000.

The preferred content of the repeating units of (I) in the copolymer is from 20 to 90%.

(2) Copolymers prepared by copolymerizing a monomer which is the precursor of the repeating unit of (I) and has the following structure

with the following monomers

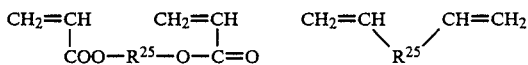

wherein R²⁵ is an alkyl or aryl group of C₁₋₂₀ which may contain biphenyl structure, phenyl benzoate structure, etc., which can provide liquid-crystalline property.

(3) Copolymers consisting of the repeating units (I) and the following repeating units

wherein u is an integer of from 1 to 30,

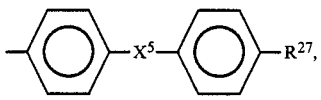

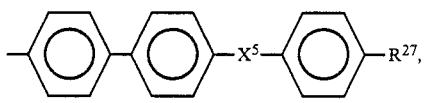

X⁵ is —COO—, —OCO— or —CH=N—, R²⁷ is —COOR²⁸, —OCOR²⁸, —OR²⁸ or —R²⁸, and R²⁸ is an alkyl fluoroalkyl or chloroalkyl group of C₁₋₁₀.

The ferroelectric liquid-crystalline polymers to be used in the present invention may include not only those having one or two asymmetric carbon atoms in the end portion of the side chains of the polymers but also those having three or more asymmetric carbon atoms in the end portion of the side chains.

Also, a mixture of the above-described ferroelectric liquid-crystalline polymers and low molecular weight liquid-crystalline compounds having SmC* phase may be employed.

The ferroelectric liquid-crystalline polymers of the above-described type (b) include, for example, blends of a polymer and a low molecular weight compound each having a proton donor and/or a proton acceptor (Refer to PCT Patent Application Laid-open No. WO 88/00606.). Such liquid-crystalline polymers include, for example, those wherein a low molecular weight liquid-crystalline compound is bonded with polyvinylacetate through hydrogen bond to form a polymeric form.

Some illustrative examples of the ferroelectric low molecular weight liquid-crystalline compounds which may be used include the followings.

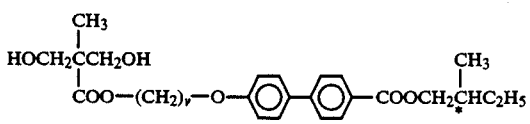

(1)

wherein, v is an integer of from 3 to 30.

(2) 2-methylbutyl 4-[4'-(12-dimethylolpropionyloxydodecyloxy)benzoyloxy]benzoate.
(3) 2-methylbutyl 4-[4'-(12-(2,2-diacetoxypropionyloxydodecyloxy)benzoyloxy]benzoate,
(4) 2-methylbutyl 4'-[12-dimethylolpropionyloxy)-dodecyloxy]biphenyl-4-carboxylate,
(5) 2-methylbutyl 4'-[12-(2,2-diacetoxypropionyloxy)-dodecyloxy]biphenyl-4-carboxylate,
(6) 2-methylbutyl 4'-[4''-(12-dimethylolpropionyloxydodecyloxy)benzoyloxy]biphenyl-4-carboxylate,
(7) 2-methylbutyl 4'-[4''-(12-(2,2-diacetoxypropionyloxy)dodecyloxy)benzoyloxy]biphenyl-4-carboxylate,
(8) 4-[4''-(12-dimethylolpropionyloxydodecyloxy)-biphenyl-4-carbonyloxy]benzoate,
(9) 2-methylbutyl 4-[4'''-(12-(2,2-diacetoxypropionyloxy)dodecyloxy)biphenylyl-4'''- -carbonyloxy]benzoate The above-described ferroelectric liquid-crystalline polymers of the type (c) include, for example, a blend of a ferroelectric low molecular weight liquid-crystalline compound and a thermoplastic amorphous polymer as disclosed in Japanese Patent Application Laid-open No. 61-47427.

The liquid-crystalline blend is a liquid-crystalline composition consisting of 10 to 80% by weight of a thermoplastic amorphous polymer and 20 to 90% by weight of a low molecular weight liquid-crystalline compound, wherein a certain amount of a specified amorphous polymer is added to a low molecular weight liquid-crystalline compound having no self-shape maintaining capability in itself to make it possible to form the mixture into film or the like and, thereby, the mixture is endowed with self-shape maintaining capability.

The thermoplastic amorphous polymers to be employed in the liquid-crystalline compositions are those having no optical anisotropy such as polystyrene and polycarbonates while the low molecular weight liquid-crystalline compounds are ferroelectric liquid-crystalline compounds having SmC* phase, for example, (1) DOBAMBC (p-decyloxybenzylidene-amino-2-methylbutyl cinnamate),
(2) 2-methylbutyl 4-octyloxybiphenyl-4'-carboxylate,
(3) 2-methylbutyl 4-(4'-octyloxybiphenylyl-4-carbonyloxy)benzoate,
(4) 4-(2-methylbutyloxy)phenyl 4-octyloxybenzoate
(5) 3-methyl-2-chloropentyl 4'-octyloxybiphenyl-4-carboxylate,
(6) 3-methyl-2-chloropentanoic acid octyloxybiphenylyl-4-ester,
(7) hexyloxybenzylidene-p'-amino-2-chloropropyl cinnamate, and
(8) 4-(2-methylbutylbenzylidene)-4'-octylaniline.

Hereinafter, the present invention will be described in details with referring the accompanying drawings.

FIG. 1 diagrammatically shows an embodiment of the process for producing a liquid crystal optical device according to the present invention and illustrates an example of continuous production process being operated continuously through all stages.

Referring to FIG. 1, in the first stage A, a substrate 2, which is one of the two flexible substrates, is continuously fed from a roller 1 for feeding a flexible substrate to a step (a) of forming an oriented layer. After forming an oriented layer on one surface (electrode layer) of the substrate 2 in the step (a), the substrate 2, at need, is guided to a rubbing step (b) to be subjected to rubbing treatment, and is then fed to the second stage B. In the second stage B a liquid-crystalline polymer layer is formed on the oriented layer formed on the substrate 2, and thus obtained substrate carrying a liquid-crystalline polymer layer is fed to the third stage C. Meanwhile, the other flexible substrate 2', in the first stage A', is fed continuously from roller 1 for feeding a flexible substrate to a step (a) of forming an oriented layer. After forming an oriented layer on one surface (electrode layer) of the substrate 2' in the step (a), the substrate 2', at need, is guided to a rubbing step (b) to be subjected to rubbing treatment, and is then fed to the second stage B'. In the second stage B', at need, an adhesive layer is formed, in the step (c) of forming an adhesive layer, on the oriented layer formed on the substrate 2', and thus obtained substrate carrying an oriented layer and an adhesive layer is then fed to the third stage C. The second stage B' may be omitted from the process and, in such a case, the substrate carrying an oriented layer which has been fed out from the first stage A' is fed to the third stage C as it is.

In the third stage C, the substrate carrying an oriented layer and an liquid-crystalline polymer layer obtained in the second stage B and the substrate obtained in the second stage B' or the first stage A' are laminated in a lamination step (e) so that the liquid-crystalline polymer layer be sandwiched between the oriented layer and the adhesive layer or between the two oriented layers, and thus obtained laminate is then fed out to the fourth stage D.

In the fourth stage D, the laminate obtained in the third stage C is, at first, heated to a temperature at which the liquid-crystalline polymer forms isotropic phase in a heating step (f), and the heated laminate is then subjected to orientation treatment in an orientation step (g) in order to orient the liquid-crystalline polymer. Thereafter, the laminate is rolled round a winding roller 15 as it is in the winding stage F to obtain the objective liquid crystal optical device or is fed to the fifth stage (E) before winding in the winding stage F. In the latter case, a polarizing plate is adhered to one or both surfaces of the laminate in a step (h) of attaching a polarizing plate in the fifth stage (E) so that a predetermined area of the surface is covered with the polarizing plate, and, then, the laminate is rolled round the winding roller 15 in the winding stage F to obtain the objective liquid crystal optical device. In FIG. 1, there is shown a guide roller 16, which may be optionally used for assisting feeding or guiding of the substrate.

FIG. 1 shows an example of a production method by a completely integrated continuous production process wherein all stages from feeding of flexible substrates to winding of the product are operated continuously. However, if desired, it is also possible to employ another type of continuous production process wherein various substrates each having been treated and obtained in each stage or step are wound once with winding rollers separately and, thereafter, the wound substrates are fed to the following stages or steps. When an intermediate product such as a flexible substrate carrying an oriented layer is separately available, it is also possible to employ another type of continuous production process wherein the intermediate product is used as the material substrate and fed continuously from a feeding roller or the like to a desired stage or step shown in FIG. 1.

Figure 5:
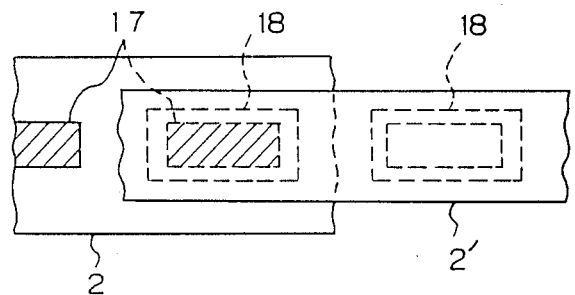
FIG. 5 is a top view (partially elevational view) illustrating the structure of a laminate, liquid-crystalline polymer layer, and adhesive layer constructed in the process of the present invention.
Figure 6A:
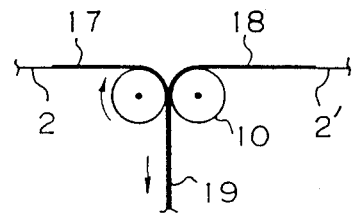
FIGS. 6(a) and FIG. 6(b) diagrammatically illustrate a mode of lamination operation employed in the laminating step (The step is represented as step (e) in FIG. 1.).
Figure 6B:
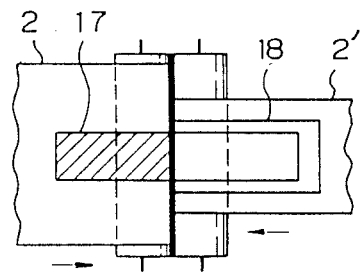

The width of the substrate 2 and the width of the substrate 2' may be identical with or different from each other. For example, it is desirable to use a substrate 2, which is to be provided with an liquid-crystalline polymer layer, having a width somewhat larger than the width of the substrate 2', which is to be provided with an adhesive layer, so that upon completion of the lamination step (e), the both sides of the substrate 2, as shown in FIGS. 5 and 6, jut out from the both sides of the substrate 2'. In FIGS. 5 and 8, the reference numeral 17 denotes a liquid-crystalline polymer layer, the reference numeral 18 denotes an adhesive layer, the reference numeral 10 denotes laminating rollers, and the reference numeral 19 denotes a laminate.

In the present invention, there is no restriction in the shape of the electrode which has been previously attached or is to be attached in the fifth stage to the substrate nor in the method of attachment. However, it is desirable to attach stripes of electrode to the substrate 2 to be provided with an liquid-crystalline polymer layer, in the longitudinal direction of the substrate (flow direction), while attaching a predetermined length of stripes of electrode to the substrate 2' to be provided with an adhesive layer, in the cross direction of the substrate (a direction making a right angle with the flow direction).

Subsequently, the main part in each stage will be described in detail referring to the attached figures such as FIG. 1.

Step of forming an oriented layer (In FIG. 1: step (a) In the first stages A and A')

The oriented layer to be employed in the present invention may be any layer used as general oriented layer and concurrently as insulating layer. The illustrative examples of the oriented layers which may be used include polyimide layer, polyvinylalcohol (PVA) layer, polyvinylidenefluoride (PVDF) layer, and silicon oxide layer.

The method of forming the oriented layer may be any kind of general method with the proviso that it is applicable to the continuous process. It is generally appropriate to employ a printing technique such as gravure or screen printing, a coating technique using a bar coater or a roll coater or the like.

Figures 2A, 2B, 2C:
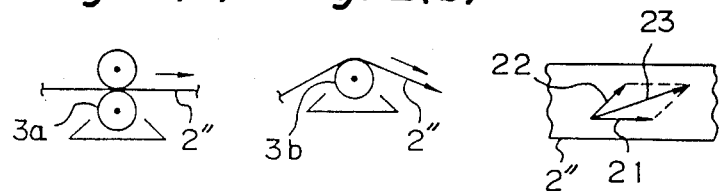
FIG. 2(a) and FIG. 2(b) each diagrammatically show a mode of the roller for forming an oriented layer, a liquid-crystalline polymer layer, and an adhesive layer, which may be employed, in the process of the present invention, in the step of forming an oriented layer, a liquid-crystalline polymer layer, and an adhesive layer (The step is represented as steps (a), (d), and (c) in FIG. 1).
FIG. 2(c) diagrammatically shows an embodiment of the orientation treatment carried out in the step (a) of forming an oriented layer according to the present invention.

In FIG. 1, the oriented layer is formed by a gravure coating technique using a roller 3 for forming an oriented layer of a type of a gravure coater shown in FIG. 2(a). However, the method to be employed in the present invention is not limited to the gravure coating technique, and it is possible to employ other techniques such as a technique using a microgravure coater shown in FIG. 2(b) or other various techniques such as those described above. In FIGS. 2(a) and 2(b), the reference numeral 3a denotes a gravure coater and the reference numeral 3b denotes a microgravure coater.

When the coating technique described above is employed to form an oriented layer, the formation of the oriented layer may be accomplished by melting a material of oriented layer described above by heating, or dissolving or dispersing it in an appropriate solvent followed by coating the resulting molten material or solution or disperse system of the material on the flexible substrate. The oriented layer may be optionally subjected to orientation treatment. The orientation treatment may be carried out simultaneously with coating operation by means of a roller 3 for forming an oriented layer, such as the above-described gravure coater. The direction of orientation in the oriented layer can be adjusted to a desired direction by controlling the angle of the rotation direction of the roller for forming an oriented layer to the flow direction of the substrate (Refer FIG. 2(c).). In FIG. 2(c), the reference numeral 21 denotes the vector directed to the flow direction of the substrate, the reference numeral 22 denotes the vector directed to the rotation direction of the roller for forming an oriented layer, and the reference numeral 23 denotes the vector directed to the orientation direction.

Thus obtained substrate carrying an oriented layer is generally dried by, for example, passing it through a drier 4 and is then fed to the subsequent step.

Rubbing step (In FIG. 1: step (b) in the first stages A and A')

Figures 3A, 3B, 3C:
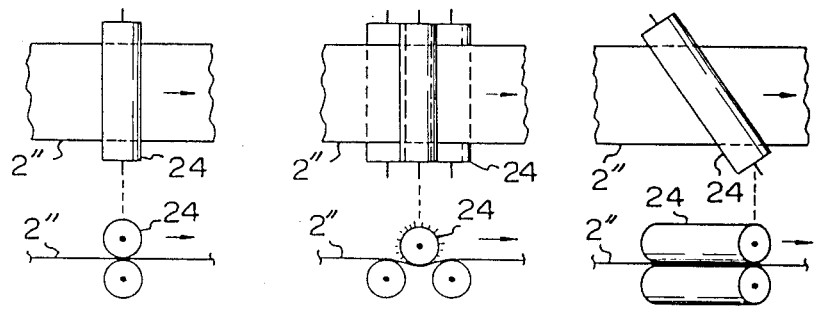
FIG. 3(a) and FIG. 3(b) each diagrammatically show a mode of the roller for rubbing treatment, which may be employed, in the process of the present invention, in the rubbing step (The step is represented as step(b) in FIG. 1.).
FIG. 3(c) diagrammatically shows an example of the manner of using a roller for rubbing treatment.

The rubbing step may be carried out by any kind of general rubbing system with the proviso that the system is applicable to the continuous process. It is generally appropriate to employ varieties of rubbing roller 5 having a rubbing mechanism. FIG. 1 shows a rubbing roller 5 of a biaxial type as shown in FIG. 3(a). However the type of the roller is not restricted to the biaxial type, and any type of roller, such as triaxial roller as shown in FIG. 3(b), may also be used. Generally, the direction of rotating the rubbing roller 5 may be aligned with the flow direction of the substrate. If desired, the direction may be optionally adjusted to make an angle with the flow direction, as shown in FIG. 3(c). In FIGS. 3(a), (b), and (c), the reference numeral 24 denotes rubbing rollers. The addition of the rubbing step (b) improves the orientation state with the result that the visual property of the product liquid crystal optical device is improved. Further, the use of rubbing technique shown in FIG. 3(c) has an advantage in preventing undesirable coloration owing to birefringence, which may occur when the material of the flexible substrate is a biaxially stretched polyethyleneterephthalate or the like.

From the viewpoint of the above-described effects, it is desirable to incorporate the rubbing step in the process of the present invention.

Step of forming an adhesive layer (In FIG. 1: step (c) in the second stage B')

The step of forming an adhesive layer may be carried out by any kind of general technique for providing an adhesive layer with the proviso that the technique is applicable to the continuous process. Generally, the step may be suitably accomplished by coating an adhesive on the oriented layer of the substrate carrying an oriented layer by employing the same technique as that employed for the step (a) of forming an oriented layer, followed by drying the adhesive layer with an drier 7. That is, the roller 6 for forming an adhesive layer may be of the same type as of the roller 3 for forming an oriented layer, and also the drier 7 may be of the same type as of the drier 4. Therefore, for example, after the substrate carrying an oriented layer which is obtained in the first stage A' (or A) is wound once with a winding roller, etc., the coating material for oriented layer may be replaced with an adhesive in order to use in both of the steps (a) and (c) concurrently the roller 3 for forming an oriented layer and the drier 4, which have been used in step (a) of the first stage A' (or A), in both of the steps (a) and (c) concurrently. These arrangements will contribute toward simplification of the apparatus.

The adhesive may be coated on a predetermined area of the circumference of the coated liquid-crystalline polymer layer, or may be coated to form a line of adhesive by supplying a predetermined amount of the adhesive using a dispenser. The addition of the step of forming an adhesive layer facilitates the lamination, improves the stability of the obtained laminate during processing, and in its turn improves the stability of the product liquid crystal optical device during processing and use. It is, therefore, desirable to incorporate the step in the process of the present invention. Also, the step of forming an adhesive layer may be added after the second stage B in FIG. 1 as the second stage B'.

The adhesive to be used may be any kind of general adhesive, and the illustrative examples of such an adhesive include epoxy resin adhesives and silicone resin adhesives.

Step of forming a liquid-crystalline polymer layer (In FIG. 1: step (d) in the second stage B)

The step of forming a liquid-crystalline polymer layer may be carried out by any kind of general technique for providing a liquid-crystalline polymer layer with the proviso that the technique is applicable to the continuous process. Generally, the step may be suitably accomplished using the same technique as employed in the above-described step of forming an oriented layer (step (a)). That is, it is preferable to coat a liquid-crystalline polymer on the oriented layer using a roller 8 for forming a liquid-crystalline polymer layer and, thereafter, dry the coated liquid-crystalline polymer layer with a drier 9. A technique such as pattern printing using a gravure coater, intermittent coating using a microgravure coater, etc. may be employed in order to coat the liquid-crystalline polymer only on a portion corresponding to the desired area of the objective liquid crystal optical device such as a liquid crystal display device. A molten liquid-crystalline polymer may be used for the coating operation. However, it is more desirable to use a solvent of a liquid-crystalline polymer in which the liquid-crystalline polymer is dissolved or dispersed in a solvent or to use a flowable polymer as it is or after adjusting the flowability by heating or the like.

The roller 8 for forming a liquid-crystalline polymer to be used in the present invention may be of the same types as those shown in FIGS. 2(a)–(c). For example, simplification of the apparatus can be attained by using the roller 3 for forming an oriented layer and the drier 4, which have been used in the step (a) in the first stage A after the substrate carrying an oriented layer obtained in the first stage A has been wound with a winding roller and the material for oriented layer has been replaced with a liquid-crystalline polymer.

The step of forming a liquid-crystalline polymer layer is generally applied to only one of the two flexible substrates as described above. However, if desired, the step may be applied to both of the substrates by adding the step as the second stage B before the second stage B' in FIG. 1. In this step, various kinds of ferroelectric liquid-crystalline polymers described above is to be used as the liquid-crystalline polymer.

Lamination step (In FIG. 1: step (e) in the third stage C)

As shown in FIG. 1, the lamination step is accomplished by laminating two substrates at least of which one substrate carries a liquid-crystalline polymer layer on its oriented layer (For example, refer FIG. 6.). Any kind of lamination technique known in the art may be employed for this step with the proviso that the technique is applicable to the continuous process. However, it is desirable to carry out the step by passing the above two substrates through between laminating rollers 10 consisting of at least a couple of rollers. While FIG. 1 shows the substrates being passed through between a set of laminating rollers 10 consisting of a couple of rollers, it is also possible to pass the substrates through two or more sets of laminating rollers. Although there is no restriction in the construction materials of the lamination rollers 10, it is generally desirable to use a laminator consisting of a couple of rollers one of which is a metal roller, and the other is a rubber roller.

Heating step (In FIG. 1: step (f) in the fourth stage D)

The heating step is carried out by heating the laminate obtained in the laminating step of the third stage to a temperature at which the used liquid-crystalline polymer exhibits isotropic phase, preferably to a temperature ranging from $T_{ISO}+2$ to $T_{ISO}+30°$ C., $T_{ISO}$ °C. being the transition temperature to isotropic phase from the lower side liquid-crystal phase. While the heating method is not particularly restricted, it is desirable to heat the laminate by passing it through a thermostatically heating chamber and/or through between a couple of heating rollers. FIG. 1 shows a particularly suitable heating method wherein the laminate is preheated by passing it through a thermostatically heating chamber 11, and is then heated with heating rollers 12. However, the heating method is not to be restricted to the method shown in FIG. 1, and other methods such as heating by passing a laminate through only one or more heating rollers or with one or more thermostatically heating chambers 11, heating a laminate with one or more couples of heating rollers 12, or a combination of the two heating methods may also be employed.

The heating rollers 12 may be of any kind of general system, such as an induction heating roller or a roller with a built-in heater.

Orientation step (In FIG. 1: step (g) in the fourth stage D)

In the orientation step the laminate heated in the above heating step is cooled to a temperature range in which the used liquid-crystalline polymer exhibits a liquid crystal phase and, thereafter is subjected to an orientation treatment to highly orient the liquid-crystalline polymer. There is no restriction in the kind of the technique for this orientation treatment with the proviso the technique is applicable to the continuous process, and any kind of technique such as those known in the art may be employed. Generally, as shown in FIG. 1, it is desirable to carry out the orientation treatment by passing a laminate through between at least a set of a couple of orientation rollers 13. While FIG. 1 shows a case where a set of orientation rollers 13 is used, if desired two or more sets of orientation rollers may be used.

The cooling to the above liquid crystal phase temperature may be generally accomplished by merely passing the laminate through between the orientation rollers 13. However, if desired, the laminate may be cooled previous to passing through between the orientation rollers 13, by using various kinds of cooling methods such as air-cooling or a method using a cooler. It is also possible to cool the orientation rollers themselves.

Figures 4A, 4B, 4C:
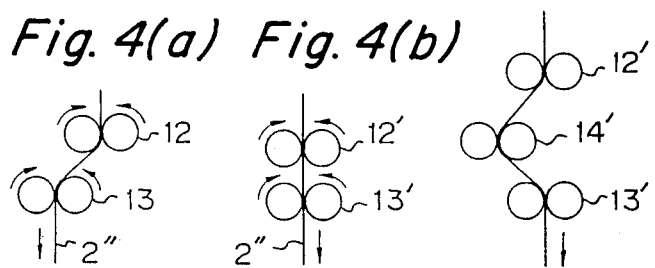
FIGS. 4(a), (b), (c), (d) and (e) each diagrammatically show an example of the linkage of the heating rollers and rollers for orientation treatment which may be used in the heating step (The step is represented as step (f) in FIG. 1.) and the orientation step (The step is represented as step (g) in FIG. 1.) respectively.
Figures 4D, 4E:
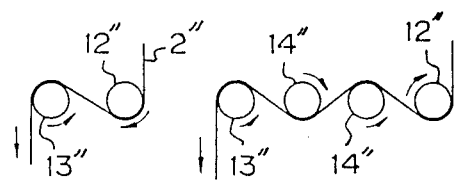

FIG. 1 shows a linkage of the system shown in FIG. 4(a) between the heating rollers 12 used in the heating step (f) and the orientation rollers 13 used in the orientation step (g). However, the system of the linkage is not to be restricted to that shown in FIG. 1, and other linkages, such as those shown in FIG. 4(b) to (e), may also be employed. In FIGS. 4(a) to (e), the reference numerals 12, 12', and 12" denote heating rollers, the reference numerals 13, 13', and 13" denote orientation rollers and the reference numerals 14 and 14' each denote heating rollers or orientation rollers.

Step of attaching a polarizing plate (In FIG. 1: step (h) in the fifth stage (E))

The step of attaching a polarizing plate may be omitted when the attachment of a polarizing plate is not required, for example, in such a case that the flexible substrate to be used has been previously equipped with a polarizing plate.

The step of attaching a polarizing plate is carried out by attaching a polarizing plate on a predetermined area of the surface of the laminate resulting from the orientation step (f). The polarizing plate to be used may be any kind of polarizing plate generally used for liquid crystal optical devices. There is no restriction in the method of attaching a polarizing plate with the proviso that it is applicable to the continuous process, and any kind of method known in the art may be employed. For example, it is desirable to form an adhesion layer on a predetermined surface of the laminate, which has been subjected to the orientation treatment, by employing the step of forming an adhesive layer in the above second stage B' and, thereafter, laminating a polarizing plate on the adhesive layer using rollers such as the laminating rollers 10.

EXAMPLES 1 to 3

EXAMPLE 1

The following treatments were carried out by using an apparatus shown in FIG. 1, using the following ferroelectric liquid-crystalline polymer:

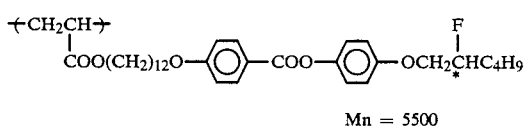

Mn = 5500

Phase transition behavior

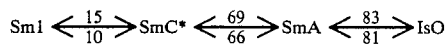

(Sm1 represents an unidentified smectic phase, the numerals represent phase transition temperatures in °C.), and using, as the substrates 2 and 2', a polyethyleneterephthalate film carrying a transparent electrode (surface resistivity: 200 Ω/cm²). The velocity of the substrates was 3 m/min.

In the first stages A and A', a 10% solution of $PVDF_{55}/TrFE_{45}$, which is a vinylidene fluoride/ethylene trifluoride copolymer ($PVDF_x/TrFE_{100-x}$), in MEK (methyl ethyl ketone) was coated on the substrates with a microgravure. After passing the substrates through a drying section of 60° C. in 50 seconds, the substrates were subjected to rubbing treatment at 200 rpm to obtain substrates each carrying an oriented layer.

In the second stage B, the above liquid-crystalline polymer was dissolved in methylene chloride to form a 10% solution, and the solution was coated with a microgravure at 150 rpm on the oriented layer of the substrate obtained above. After the evaporation of solvent, the thickness of the obtained liquid-crystalline polymer layer was 2.1 μm.

Meanwhile, in the second stage B', an epoxy adhesive (EPOTAC XA-1295/HQ-1 produced by Nippon Pernox Co., Ltd.) was coated, using a dispenser, on the oriented layer carried by the substrate in a form of a line.

The substrates obtained in the second stage B and B' were laminated in the lamination step (e) of the third stage C, with the liquid-crystalline polymer layer sandwiched between the oriented layer and the adhesive layer, to obtain a laminate.

In the fourth stage D, the obtained laminate was subjected to heating treatment and orientation treatment using two couples of heating rollers. The temperature of the first set of rollers were adjusted to 90° C., the second set of rollers to 68° C., to conduct the transition from isotropic phase to liquid crystal phase.

When the device obtained by the above operation was sandwiched between crossed polarizers and applied electric fields with ±10 V, the contrast ratio was about 90.

EXAMPLE 2

The following treatments were carried out by using an apparatus shown in FIG. 1, using the following ferroelectric liquid-crystalline polymer:

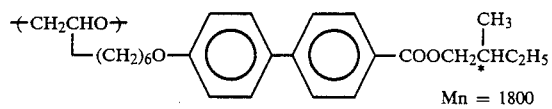

Mn = 1800

Phase transition behavior

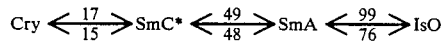

(Cry represents crystal state.)
and using, as the substrates 2 and 2', a PES substrate with ITO.

A 10% solution of $PVDF_{65}/TrFE_{35}$ in DMA (dimethyl acetamide) was coated on the substrates by gravure coating technique. Then the substrate was dried at 80° C. for 40 seconds to obtain an oriented layer of 50 nm in thickness.

A 10% solution of the above liquid-crystalline polymer in methylene chloride was prepared, and the solution was gravure-coated on the substrate 2, and then the substrates were laminated in the same manner as Example 1. The adhesive used was SUMILITE ERS-1020/ERS-18 produced by Sumitomo Bakelite Co., Ltd. Three couples of heating rollers were used for orientation operation, the first couple being adjusted at 110° C., the second couple at 75° C., and the third couple at 65° C.

When the obtained device was sandwiched between crossed polarizers and applied electric fields with ±10 V at 25° C., the contrast ratio was 135.

EXAMPLE 3

The following treatments were carried out by using an apparatus shown in FIG. 1, using the following ferroelectric liquid-crystalline polymer:

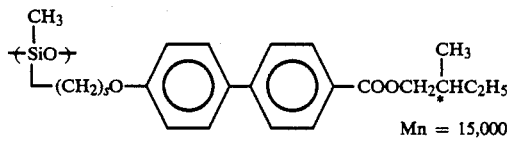

Phase transition behavior

(Glass represents glass state.),
using, as the substrates 2 and 2', a PES substrate with ITO, and using a 5% solution of polyimide (SUNEVER 230 produced by Nissan Chemical Co., Ltd.) in 2-methylpyrrolidone as the oriented layer. The above liquid-crystalline polymer was coated in the same manner as Example 2, and a device was produced. The contrast ratio between the crossed polarizers was about 110 in the temperature range of 40° to 87° C.

What is claimed is:

1. A process for producing a liquid crystal optical device from two continuous, flexible substrates, each supporting an electrode layer, the liquid crystal optical device comprising a ferroelectric liquid-crystalline polymer arranged between the two flexible substrates, with the electrode layers facing each other, and said substrates each having an oriented layer provided over the electrode layer, which process comprises the following stages:
   (1) a first stage comprising a step of providing an oriented layer on each of the two continuous, flexible substrates by forming a layer of material having a desired direction of orientation on the exposed surface of the electrode layer supported by each of the continuous, flexible substrates;
   (2) a second stage comprising a step of forming at least one liquid-crystalline polymer layer respectively on at least one of the oriented layers provided on the two continuous, flexible substrates, by applying a ferroelectric liquid-crystalline polymer material on the exposed surface of the at least one of the oriented layers;
   (3) a third stage comprising a step of laminating the two continuous, flexible substrates together, with the at least one liquid-crystalline polymer layer being arranged between the oriented layers provided on the continuous, flexible substrates to form a laminate; and
   (4) a fourth stage comprising a step of heating the laminate to a temperature at which the ferroelectric liquid-crystalline polymer shows isotropic phase, and a subsequent step of orienting the heated ferroelectric liquid-crystalline polymer by applying an orientation treatment to the laminate at a temperature at which the ferroelectric liquid-crystalline polymer shows a liquid crystal phase.

2. The process according to claim 1, wherein in the heating step of the fourth stage, the laminate is heated to a temperature at which the ferroelectric liquid-crystalline polymer shows isotropic phase by passing the laminate through a pair of heating rollers.

3. The process according to claim 1, wherein in the heating step of the fourth stage, the laminate is heated to a temperature at which the ferroelectric liquid-crystalline polymer shows isotropic phase by passing the laminate through a pair of heating rollers and through a thermostatically heating chamber.

4. The process according to claim 1, wherein, in the orientation step of the fourth stage, the ferroelectric liquid-crystalline polymer is oriented by passing the laminate through at least a pair of rollers at a temperature at which the ferroelectric liquid-crystalline polymer shows a liquid crystal phase so as to apply a stress to the ferroelectric liquid-crystalline polymer enclosed in the laminate.

5. The process according to claim 1, further comprising a step of forming an adhesive layer in the second stage before the step of forming the at least one liquid-crystalline polymer layer, the adhesive layer being formed on the oriented layer of at least one of the continuous, flexible substrates by applying an adhesive on the exposed surface of the oriented layer.

6. The process according to claim 1, further comprising in the second stage, a step of rubbing before the step of forming at least one liquid-crystalline polymer layer, by applying a rubbing treatment to the exposed surface of the oriented layer on at least one of the continuous, flexible substrates.

7. The process according to claim 6, further comprising a step of forming an adhesive layer between the step of rubbing and the step of forming at least one liquid-crystalline polymer layer, the adhesive layer being formed on the exposed surface of the oriented layer of at least one of the rubbing-treated, continuous, flexible substrates.

8. A process for producing a liquid crystal optical device from two continuous, flexible substrates, each supporting an electrode layer, the liquid crystal optical device comprising a ferroelectric liquid-crystalline polymer arranged between the two flexible substrates, with the electrode layers facing each other, and said substrates each having an oriented layer provided over the electrode layer, which process comprises the following stages:
   (1) a first stage comprising a step of providing an oriented layer on each of the two continuous, flexible substrates by forming a layer of material having a desired direction of orientation on the exposed surface of the electrode layer supported by each of the continuous, flexible substrates;
   (2) a second stage comprising a step of forming at least one liquid-crystalline polymer layer, respectively, on at least one of the oriented layers provided on the two continuous, flexible substrates, by applying a ferroelectric liquid-crystalline polymer material on the exposed surface of the at least one of the oriented layers;
   (3) a third stage comprising a step of laminating the two continuous, flexible substrates together, with the at least one liquid-crystalline polymer layer being arranged between the oriented layers provided on the continuous, flexible substrates to form a laminate;

(4) a fourth stage comprising a step of heating the laminate to a temperature at which the ferroelectric liquid-crystalline polymer shows isotropic phase, and a subsequent step of orienting the heated ferroelectric liquid-crystalline polymer by applying an orientation treatment to the laminate at a temperature at which the ferroelectric liquid-crystalline polymer shows a liquid crystal phase; and (5) a fifth stage comprising a step of attaching a polarizing plate on the orientation-treated laminate.

9. The process according to claim 8, wherein, in the heating step of the fourth stage, the laminate is heated to a temperature at which the ferroelectric liquid-crystalline polymer shows isotropic phase by passing the laminate through a pair of heating rollers.

10. The process according to claim 8, wherein, in the heating step of the fourth stage, the laminate is heated to a temperature at which the ferroelectric liquid-crystalline polymer shows isotropic phase by passing the laminate through a pair of heating rollers and through a thermostatically heating chamber.

11. The process according to claim 8, wherein, in the orientation step of the fourth stage, the ferroelectric liquid-crystalline polymer is oriented by passing the laminate through at least a pair of rollers at a temperature at which the ferroelectric liquid-crystalline polymer shows a liquid crystal phase so as to apply a stress to the ferroelectric liquid-crystalline polymer enclosed in the laminate.

12. The process according to claim 1, further comprising a step of forming an adhesive layer in the second stage before the step of forming the at least one liquid-crystalline polymer layer, the adhesive layer being formed on the oriented layer of at least one of the continuous, flexible substrates by applying an adhesive on the exposed surface of the oriented layer.

13. The process according to claim 1, further comprising in the second stage, a step of rubbing before the step of forming at least one liquid-crystalline polymer layer, by applying a rubbing treatment to the exposed surface of the oriented layer on at least one of the continuous, flexible substrates.

14. The process according to claim 1, further comprising a step of forming an adhesive layer between the step of rubbing and the step of forming at least one liquid-crystalline polymer layer, the adhesive layer being formed on the exposed surface of the oriented layer of at least one of the rubbing-treated, continuous, flexible substrates.

15. A process for producing a liquid crystal optical device from two continuous, flexible substrates, each supporting an electrode layer and an oriented layer on the electrode layer, the liquid crystal optical device comprising a ferroelectric liquid-crystalline polymer arranged between the two flexible substrates, with the respective electrode layers facing each other and the respective oriented layers provided on the electrode layers, which process comprises the following stages:

(1) a first stage comprising a step of forming at least one liquid-crystalline polymer layer on at least one of the oriented layers supported by the continuous, flexible substrates, by applying a ferroelectric liquid-crystalline polymer material on an exposed surface of the oriented layer;

(2) a second stage comprising a step of laminating the two continuous, flexible substrates together, with the at least one liquid-crystalline polymer layer being arranged between the oriented layers provided on the continuous, flexible substrates to form a laminate; and (3) a third stage comprising a step of heating the laminate to a temperature at which the ferroelectric liquid-crystalline polymer shows isotropic phase, and a step of orienting the heated ferroelectric liquid-crystalline polymer by applying an orientation treatment to the laminate at a temperature at which the ferroelectric liquid-crystalline polymer shows a liquid crystal phase.

16. A process for producing a liquid crystal optical device from two continuous, flexible substrates, each supporting an electrode layer and an oriented layer on the electrode layer, the liquid crystal optical device comprising a ferroelectric liquid-crystalline polymer arranged between the two flexible substrates, with the respective electrode layers facing each other and the respective oriented layers provided on the electrode layers, which process comprises the following stages:

(1) a first stage comprising a step of forming at least one liquid-crystalline polymer layer on at least one of the oriented layers supported by the continuous, flexible substrates, by applying a ferroelectric liquid-crystalline polymer material on an exposed surface of the oriented layer;

(2) a second stage comprising a step of laminating the two continuous, flexible substrates together, with the at least one liquid-crystalline polymer layer being arranged between the oriented layers provided on the continuous, flexible substrates to form a laminate;

(3) a third stage comprising a step of heating the laminate to a temperature at which the ferroelectric liquid-crystalline polymer shows isotropic phase, and a step of orienting the heated ferroelectric liquid-crystalline polymer by applying an orientation treatment to the laminate at a temperature at which the ferroelectric liquid-crystalline polymer shows a liquid crystal phase; and (4) a fourth stage comprising a step of attaching a polarizing plate on the orientation-treated laminate obtained in the third stage.

17. The process according to claim 1, wherein in the heating step of the fourth stage, the laminate is heated to a temperature at which the ferroelectric liquid-crystalline polymer shows isotropic phase by passing the laminate through a thermostatically heating chamber.

18. The process according to claim 8, wherein, in the heating step of the fourth stage, the laminate is heated to a temperature at which the ferroelectric liquid-crystalline polymer shows isotropic phase by passing the laminate through a thermostatically heating chamber.

* * * * *